T. BRANNAN.
Mole-Traps.
No. 153,235.
Patented July 21, 1874.
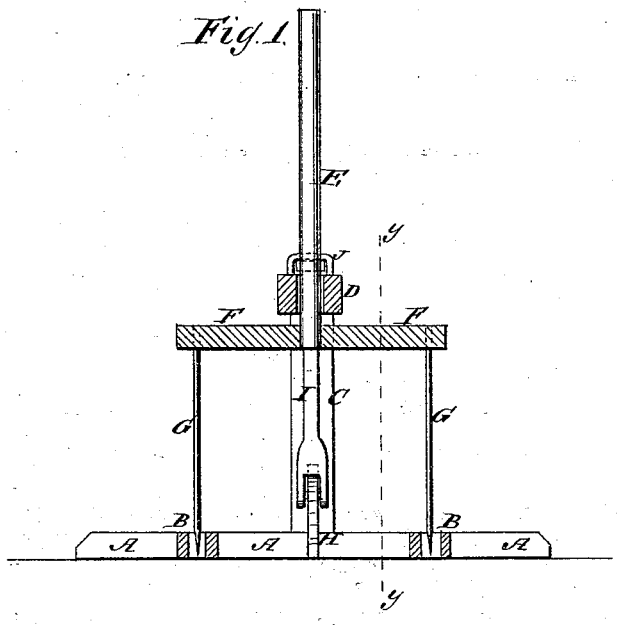
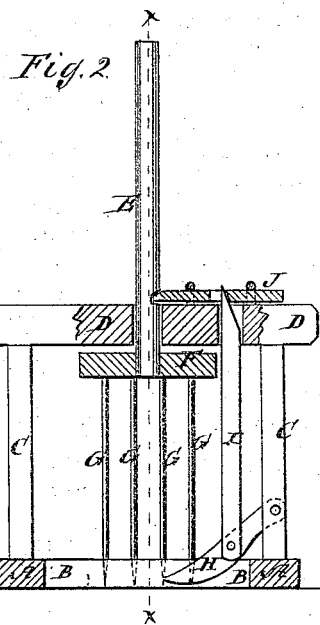
WITNESSES:
E. Wolff
Sedgwick
INVENTOR:
T. Brannan
BY Munn & Co
ATTORNEYS.

UNITED STATES PATENT OFFICE.

THOMAS BRANNAN, OF CARROLLTON, ILLINOIS.

IMPROVEMENT IN MOLE-TRAPS.

Specification forming part of Letters Patent No. 153,235, dated July 21, 1874; application filed May 29, 1874.

*To all whom it may concern:*

Be it known that I, THOMAS BRANNAN, of Carrollton, in the county of Greene and State of Illinois, have invented a new and useful Improvement in Mole-Trap, of which the following is a specification:

Figure 1 is a vertical longitudinal section of my improved mole-trap, taken through the line $x$ $x$, Fig. 2. Fig. 2 is a vertical cross-section of the same, taken through the line $y$ $y$, Fig. 1, and part being broken away to show the construction.

Similar letters of reference indicate corresponding parts.

My invention has for its object to furnish an improved mole-trap, simple in construction, convenient in use, and reliable in operation. The invention consists in an improved mole-trap formed of the base-frame, the upright frame, the drop, the spikes, and the tripping device, constructed and arranged to operate as hereinafter fully described.

A are the long sills of the base-frame, which are about sixteen inches in length, and into which are framed the ends of the cross-sills B, which are about eleven inches in length, are placed equally distant from the ends of the sills A, and about seven inches apart. To the centers of the long sills A are attached the lower ends of two posts, C, about eight inches in height, and the upper ends of which are connected by a cross-bar, D, forming an upright frame. In the center of the cross-bar D is formed a hole for the passage of the rod E, to the lower end of which, below the cross-bar D, is attached a wide bar, F, about eleven inches long, to each end of which is attached a series of sharp-pointed spikes, G. The spikes G are about eight inches long, and are attached to the ends of the bar F, about an inch apart. The two series of spikes are thus about nine inches apart, and the said spikes pass down through holes in the short sills B. To the lower part of one of the posts C is pivoted the end of a trigger, H, to which is pivoted the lower end of the push-bar I, which passes up through a hole in the cross-bar D, and through a hole in the slide-bar J. The bar J slides in keepers upon the upper side of the cross-bar D, and its forward or inner end enters a notch in the side of the rod E, when said rod is fully raised. The outer side of the upper end of the push-bar I is beveled, as shown in Fig. 2, so as, when the trigger H is operated, to push the slide J back, and allow the rod E and bar F to drop, driving the spikes G into the ground. The bar F is made heavy, so as to drive the spikes G down with force.

In using the trap, some straight place in a mole-track is selected, and the ground pressed down smooth with the foot. The trap is then placed lengthwise upon the track, and the dropper or fall is worked down and up until the spikes G pass freely through the ground. The drop is then raised and held by the slide J, the trigger H resting firmly upon the ground. With this arrangement, as the mole comes along in either direction, when his nose strikes the trigger H the drop falls, driving the spikes G through him, killing him instantly.

Having thus described my invention, what I claim as new, and desire to secure by Letters Patent, is—

The improved mole-trap, formed of the base-frame A B, the upright frame C D, the drop E F, the spikes G, and the tripping device H I, and latch-bolt J, constructed and arranged to operate substantially as herein shown and described.

THOMAS BRANNAN.

Witnesses:
J. E. EVANS,
L. R. LAKIN.